(12) United States Patent
Shapiro et al.

(10) Patent No.: US 8,069,073 B2
(45) Date of Patent: *Nov. 29, 2011

(54) SYSTEM AND METHOD FOR FACILITATING BILATERAL AND MULTILATERAL DECISION-MAKING

(75) Inventors: Eileen C. Shapiro, Cambridge, MA (US); Steven J. Mintz, Saddle River, NJ (US)

(73) Assignee: Dalton Sentry, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/754,291

(22) Filed: Apr. 5, 2010

(65) Prior Publication Data
US 2010/0191664 A1 Jul. 29, 2010

Related U.S. Application Data

(63) Continuation of application No. 11/711,249, filed on Feb. 27, 2007, now Pat. No. 7,725,347, which is a continuation of application No. 11/171,082, filed on Jun. 29, 2005, now Pat. No. 7,184,968, which is a continuation of application No. 09/538,556, filed on Mar. 29, 2000, now Pat. No. 6,915,269.

(60) Provisional application No. 60/173,259, filed on Dec. 23, 1999.

(51) Int. Cl.
*G06Q 10/00* (2006.01)
(52) U.S. Cl. .................... 705/7.14; 705/327; 705/321
(58) Field of Classification Search ................ 705/7.14, 705/327, 321
See application file for complete search history.

(56) References Cited

U.S. PATENT DOCUMENTS
4,258,351 A * 3/1981 Shigeta et al. ............... 340/942
6,711,522 B2 * 3/2004 Shirai et al. ................. 702/179

OTHER PUBLICATIONS

Gilbert, "The Myth of Fingerprints", *Stumbling on Happiness*, pp. 245-257 (2006).
Lehrer, "Choking on Thought", *How We Decide*, pp. 133-166 (2009).

* cited by examiner

*Primary Examiner* — Johnna Loftis
(74) *Attorney, Agent, or Firm* — Sunstein Kann Murphy & Timbers LLP

(57) ABSTRACT

Techniques for facilitating evaluation, in connection with the procurement or delivery of products or services, in a context of at least one of (i) a financial transaction and (ii) operation of an enterprise, are disclosed. The techniques involve retrieving party and counterparty preference data from digital storage media; performing multilateral analyses of the combined preference data by computing a closeness-of-fit value; and delivering a list matching the at least one party and the at least one counterparty using the computed closeness-of-fit values.

9 Claims, 11 Drawing Sheets

SYSTEM AND METHOD FOR FACILITATING BILATERAL AND MULTILATERAL DECISION-MAKING

CROSS-REFERENCE TO RELATED APPLICATIONS

This application is a continuation of our application Ser. No. 11/711,249, filed Feb. 27, 2007, which is a continuation of our application Ser. No. 11/171,082, filed Jun. 29, 2005 (U.S. Pat. No. 7,184,968), which is a continuation of our application Ser. No. 09/538,556, filed Mar. 29, 2000 (U.S. Pat. No. 6,915,269), which claims the benefit of our provisional application Ser. No. 60/173,259, filed Dec. 23, 1999; these related applications are hereby incorporated herein by reference.

TECHNICAL FIELD

The present invention relates to bilateral and multilateral evaluation methods and systems.

BACKGROUND

Consumers constantly decide which products and services best satisfy their needs and desires. Producers correspondingly decide how best to configure their products and services, from amongst a wide array of choices. They must not only choose a suitable price, but also must decide which combination of other attributes of their products and services will best satisfy consumers.

In order to facilitate these decisions, there have therefore arisen a variety of marketing research techniques. Among these are forced trade-off or forced choice methodologies, including conjoint analysis. Through statistical methods, these techniques allow prediction of which attributes of products and services are relatively more and less valuable to a given group of constituents.

Based on these conventional techniques, producers of goods and services are able to model buyers' or users' preferences, thereby facilitating design or selection of products and processes that best satisfy those preferences. For persons on two sides of a transaction (a producer and a group of consumers, for example), conventional techniques permit persons on one side of the transaction to model the preferences of a group of constituents on the other side of the transaction. Conventional techniques may therefore be called unilateral, or one-sided, evaluation techniques.

SUMMARY OF THE INVENTION

In accordance with one aspect of the invention there is provided a method for facilitating evaluation, in connection with the procurement or delivery of products or services, in a context of at least one of (i) a financial transaction and (ii) operation of an enterprise, such context involving a member of a first class of parties in a first role and a member of a second class of counterparties in a second role. The method involves supplying to at least one of the parties a series of forced choice questions so as to elicit party responses; supplying to at least one of the counterparties a series of forced choice questions so as to elicit counterparty responses; and delivering a list matching the at least one party and the at least one counterparty according to analysis of preference profiles determined using conjoint analysis of the party responses and the counterparty responses.

In alternative embodiments, the list may be ranked according to closeness of fit.

In alternative embodiments, the method may further involve supplying to at least one party or counterparty co-evaluator a series of forced choice questions so as to elicit co-evaluator responses, wherein the list matches the at least one party and the at least one counterparty according to analysis of preference profiles determined using such co-evaluator responses.

In alternative embodiments, the party responses may reveal, with respect to each level of each of a first series of attributes, a utility value which indicates the value that the party places on the level of the attribute. Such party responses may reveal the utility values without the utility values being provided explicitly. Additionally, the counterparty responses may reveal, with respect to each level of each of a second series of attributes that complements the first series of attributes, a utility value which indicates the value that the counterparty places on the level of the attribute. Such counterparty responses may reveal the utility values without the utility values being provided explicitly.

In alternative embodiments, the series of forced choice questions and/or the list may be obtained from a remote server over a communication network. The series of forced choice questions may be supplied by making available a set of web pages providing a set of questions and permitting entry of responses thereto. The party responses and the counterparty responses may be provided to a remote server over a communication network.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
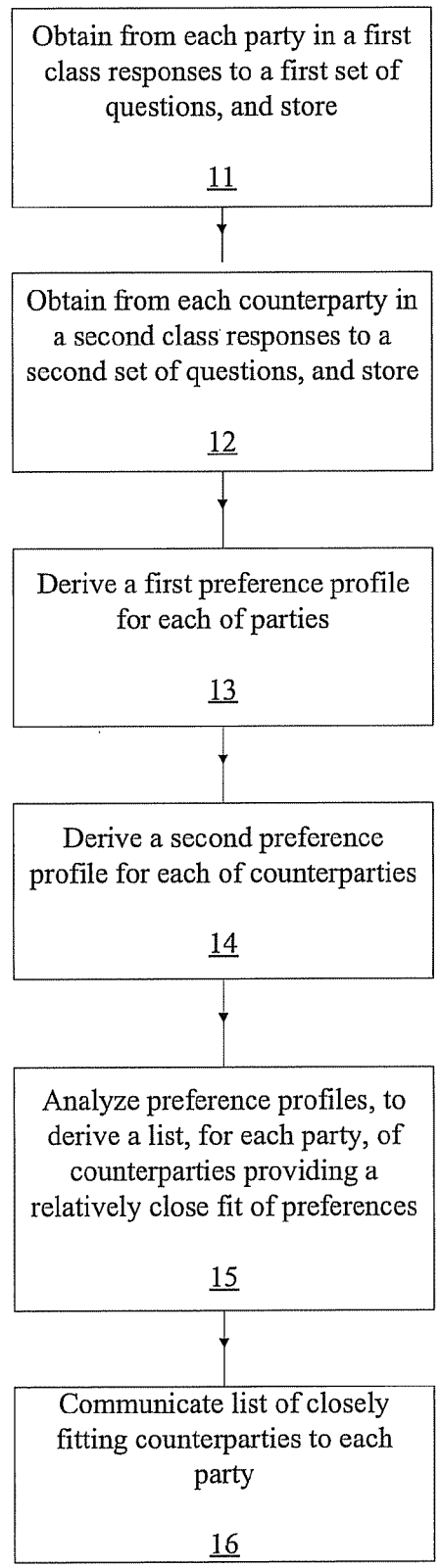
FIG. 1 shows a block diagram of an embodiment of a method in accordance with the present invention for facilitating bilateral and multilateral decision-making.

By contrast with conventional methods, embodiments of the present invention enable a bilateral evaluation of preferences: a decision is recommended based on its providing a relatively close fit between the preferences of each potential pairing of party and counterparty to a potential transaction, when compared with other possible pairs of parties to the potential transaction. Indeed, embodiments of the present invention may likewise be employed when information about preferences is provided not just by two parties to the transaction (a party and a counterparty), but also by at least one co-evaluator, who provides a useful perspective on the preferences of a party or a counterparty. In this case, the evaluation is multilateral rather than bilateral.

In various embodiments of the present invention, there can be employed questions that require a forced choice to reveal preferences of the respondent. The benefit of the forced choice approach is that it helps to uncover underlying preferences that are hidden and sometimes not consciously evident even to the respondent.

In this connection embodiments of the invention may employ conjoint analysis. See for example, Cattin, P. and R. R. Wittink, "Commercial Use of Conjoint Analysis: A Survey", 45 *Journal of Marketing* 44-53 (No. 3, Summer, 1982), and "Commercial Use of Conjoint Analysis: An Update", 53 *Journal of Marketing* 91-96 (July, 1982); Green, P. E. and Y. Wind, "New Way to Measure Consumers' Judgments," *Harvard Business Review*, July 1975 ("Green and Wind"); see also the references identified in the extensive bibliography of Patrick Bohl: *Conjoint Literature Database CLD*, University of Mainz, Germany, 1997. The foregoing articles and references are hereby incorporated herein by reference.

As used in this description and the accompanying claims, the following terms shall have the meanings indicated, unless the context otherwise requires:

The term "party" includes a natural person or an entity, wherein an entity may be any association, organization, or governmental agency. A "counterparty" is similarly any other natural person or an entity.

A "financial transaction" is a transaction in which services or products are being procured or delivered under circumstances involving an expectation that they will be paid for. Thus "financial transactions" include enrollment at a college or university or a private school (wherein educational services are rendered for tuition), employment by an entity (wherein an employee's services are rendered for payment by the employer), engagement of a physician or health maintenance organization (wherein health care services are provided for compensation), choosing a retirement community, investing in a mutual fund, taking a vacation, or in executing a merger or joint venture or acquisition. The terms "services" and "products" include the singular as well as the plural.

An "enterprise" is a business organization (regardless of form), a government agency or organ, or a non-profit-organization (including a religious, scientific, or charitable organization).

"Attributes" of a product or service include characteristics, features, and benefits of the product or service. Hence (as an example) if the service is college education, attributes may include the size of the school, the prestige of the school, and the degree of structure of the school's educational program.

A "level" of an attribute is a value associated with the attribute that pertains to a characteristic, feature or benefit of a product or service. The value may, but need not, be quantitative; the value may be categorical. Hence if the service is college education, the level of the attribute "school size" may be quantitative, as for example, "9378 students", or may be categorical, as for example, "between 5,000 and 10,000." Attribute levels may be categorized even when more abstract attributes are involved. For example, if the attribute is prestige, a level may be "widely viewed as highly prestigious"; if the attribute is degree of structure in the education program, a level may be "low degree of structure".

FIG. 1 is a block diagram of an embodiment of a method in accordance with the present invention for facilitating bilateral and multilateral decision-making. In this embodiment, six activities are involved. As shown in item 11, first there is obtained from each party in a first class responses to a first set of questions, and the responses are stored in a suitable digital storage medium. Also, in item 12, there is obtained from each counterparty in a second class responses to a second set of questions, and the responses are stored in a suitable digital storage medium. (We discuss the nature of suitable questions in connection with later figures.) (Note items 11 and 12 need not be contemporaneous and need not be sequenced in any order.) In item 13, a first preference profile is generated for each party, based on the party's responses to the first set of questions; and, similarly, a second preference profile is generated, in item 14, for each counterparty, based on the counterparty's responses to the second set of questions. The questions and the resulting profiles may be developed using any of a wide range of approaches. In some embodiments, as described below, there may be employed conjoint analysis or other forced-choice methodologies. It is within the scope of the invention to utilize a first methodology in connection with the first set of questions and a second methodology in connection with the second set of questions. Once these preference profiles have been generated, the method next analyzes, for each party in the first class, the preference profiles of counterparties in the second class, and derives a ranked list of counterparties that provide the closest fit of preferences with that party, as compared with the fit of all counterparties in the second class (item 15). Finally, in item 16, the list of closest fitting counterparties for each party is communicated to that party. (Similarly for each counterparty, the method derives a ranked list of parties that provide the closest fit of preferences with that counterparty, as compared with the fit of all parties in the first class; and the list of closest fitting parties for each counterparty is communicated to that counterparty.) By providing such a list in each case, based on a bilateral or multilateral preference analysis, the method facilitates parties and counterparties in making decisions that are based on the closeness of the fit between their preferences.

Figure 2:
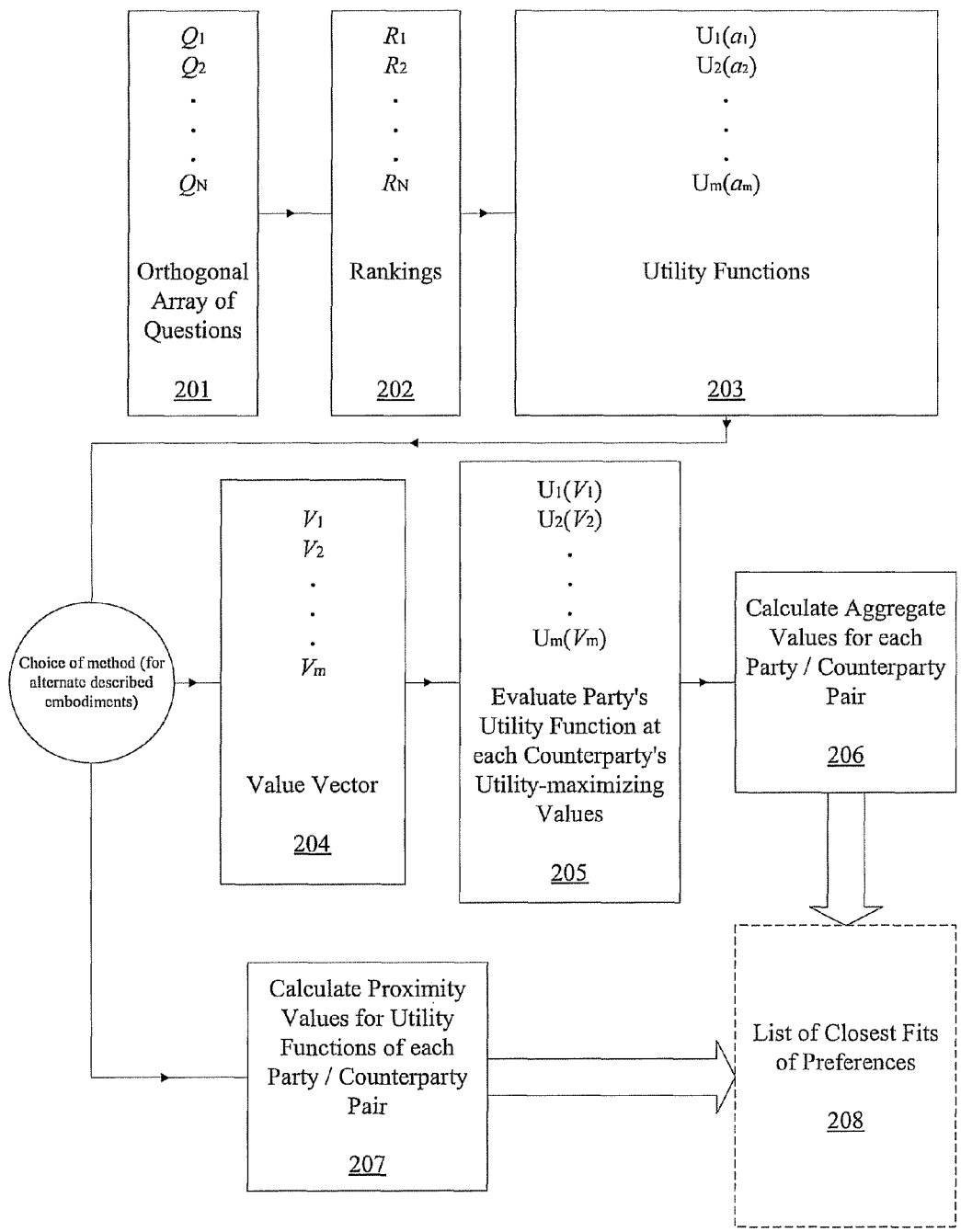
FIG. 2 shows a block diagram of a further embodiment of a method in accordance with the present invention in which conjoint analysis is employed.

FIG. 2 shows one embodiment of a method according to the invention, in which, first, preference profiles for parties and counterparties are generated using conjoint analysis techniques. Conventional conjoint analysis techniques, used in a unilateral fashion, are described in the references described above near the beginning of this section of the description.

Once preference profiles have been generated according to the embodiment of FIG. 2, they are then used to recommend to each party a set of counterparties who provide the closest fit of preferences amongst the counterparties considered. Since the embodiment uses a preference profile for both parties and counterparties to evaluate the closeness of fit of preferences, it is a bilateral preference analysis method as opposed to the unilateral methods of the prior art.

We now consider the embodiment of FIG. 2 in further detail. First, in the embodiment of FIG. 2, a set of questions 201 is posed to each party and counterparty. The questions are designed to reveal the utility value that each respondent places on the possible levels of a set of attributes $\{a_1, a_2, \ldots a_m\}$ related to the proposed transaction.

Bilateral preference methodologies according to the embodiment of FIG. 2 are useful in, but are not limited to, three exemplary contexts.

In the first exemplary context, an individual party wishes to enter a transaction with an organization counterparty. In the transaction, the party seeks to identify an organization with respect to which the preferences of such party are a good fit relative to the alternatives. The organization counterparty, on the other hand, seeks to give entry to parties who will be successful within the organization. Examples of the first exemplary context include a student (as the individual party) choosing colleges to attend (the organization counterparty), and an employee (the individual party) choosing a corporate employer (the organization counterparty).

In the first exemplary context, the questions asked of the party are designed to reveal the utility values that the party places on possible levels of a set of attributes related to the environment within the counterparty organization. The preference profile created by the party's answers can thus be called a "value profile" in this context. By contrast, the questions asked of each potential counterparty organization are designed to reveal the preference profile that the counterparty considers necessary for a party to be successful within its organization. The preference profile created by the counterparty's answers in this context can thus be called a "success profile". In the first exemplary context, a decision is recommended to the party based on a relatively close fit between the party's value profile and the counterparty's success profile.

Note that questions for a counterparty organization in the first exemplary context are not necessarily directed to revealing profiles of successful individuals within its organization in the past. The questions may instead elicit the value profiles of individuals that the counterparty believes will be successful within its organization in the future.

In a second exemplary context, both the party and the counterparties to a potential transaction are organizations. In the transaction, the party and counterparty seek to join together to form one organization. An example of such a context is a corporate merger or acquisition. In the second exemplary context, the questions asked of both the party and potential counterparties are designed to reveal the value profile that each respondent considers necessary for success within its organization. Thus, in the second exemplary context, a decision is recommended based on a relatively close fit between the success profiles of the party and counterparty. In a merger example, such a recommended decision maximizes "culture fit" between merging companies.

Finally, in a third exemplary context, both the party and the counterparties to a potential transaction are individuals. In the transaction, the party and counterparty seek to enter a financial relationship. For example, an individual party may seek a counterparty partner for a joint venture. In this third context, the questions asked of the party and each potential counterparty are designed to reveal the utility value that each respondent places on possible levels of a set of attributes related to the proposed relationship. A decision is then recommended based on a relatively close fit between the resulting value profiles of the party and a counterparty.

For convenience in this section of the description, we refer predominantly to a "potential transaction". However, embodiments of the present invention may also be used in dealing with operation of an enterprise. In such a case, the party and the counterparty may (but need not) be different constituents of the same enterprise and the issues of fit between the constituents may involve, for example, addressing organizational inefficiencies in the workplace and a wide variety of other activities. In one example, the party and counterparty may be management and labor, and the issue of fit may involve a company policy to deal with staggered work hours. Alternatively, the party and counterparty may be a managers of two different divisions of a company having competing claims on a common resource to them, such as marketing. Or, as yet another example, the enterprise may be city government, the party may be the police force, the counterparty may be the mayor, and the issues of fit may be related to employee benefits, including terms of a health insurance, to cover the police force. In any case, the technical approach for embodiments of this type is similar to that described below with respect to a potential transaction between party and counterparty.

A common feature of questions used in each of the exemplary contexts is that the attributes are chosen so that those of the parties "mirror," or otherwise complement, those of the counterparties. For example, for a party who is a college applicant deciding which college to attend, the attributes may include: population of the locality in which the school is located, degree of structure of the learning environment, and average class size. The counterparties for this transaction may be college admissions personnel, and their "mirror" attributes in helping students to decide whether this school would provide a close fit of preferences may be: "students who do well here prefer being in a locality with what population"; "students who do well here prefer attending a school with what degree of structure of the learning environment"; and "students who do well here prefer having classes of what average class size."

An example of questions according to one embodiment of the invention is provided in Table 1 for college applicants and for colleges seeking applicants. Table 2 provides a similar set of questions for mutual fund purchasers and mutual funds seeking investors. Table 3 provides a set of questions for job seekers and employers seeking job candidates.

In process 201 of the embodiment of FIG. 2, each respondent is posed N questions $\{Q_1, Q_2, \ldots Q_N\}$. As described above, questions for counterparties typically mirror the questions for parties. These questions may be fashioned in a wide variety of forms. In one form of questioning, each respondent is provided a series of individual multi-attribute descriptions and asked to rate each of these descriptions. In another form of questioning, each respondent is provided with a series of pairs of multi-attribute alternative descriptions, and is asked, for each pair, to select a desired one of the alternatives. In yet another form of questioning, each respondent may be asked to select from among two or more alternative multi-attribute descriptions.

Proper design of the questions permits statistical evaluation of the responses, from which may be derived utility values for each respondent. For example, the college applicant may be asked to rate a selection of potential colleges from 1 to 10, with 10 being most favorable; each college may be characterized by a level for each of a series of attributes. For example, in the case of attributes such as population of locality, degree of structure of the learning environment, and class size, one of the colleges to be ranked may be characterized by levels as follows: in a locality with population 100,000, unstructured learning environment, and small class size.

In general, each attribute $\{a_i\}$ will have possible attribute levels which characterize it—in the example, there may be possible college locations with populations between 15,000 and 100,000; two options for learning environment (structured or unstructured); three class sizes (small, medium, and large), and so on. Note that the attribute levels need not be numbers, but may also be yes/no choices, or choices of items from a list of categories. Furthermore, note that attributes, and levels of the attribute, may also be directed to "soft" characteristics related to a transaction; that is, characteristics which are more emotional in nature and less quantifiable. For example, in an employment setting, a relevant attribute could be the degree of expected after-work socializing with fellow employees, and the levels of the attribute could be "rare," "moderate," and "frequent."

The questions $\{Q_i\}$ need not, however, ask each respondent to evaluate a list of all possible combinations of attribute levels. Rather, the set of questions actually posed to the respondents are selected to achieve a balance across independent contributions of each attribute (or, alternatively, such that every point in the space of possible attribute level combinations may be represented as a linear combination of the chosen combinations). In other words, the questions may be designed so that responses to them can be analyzed in terms of attributes that, in mathematical terms, are orthogonal to one another or nearly so.

In order to increase efficiency of the process of obtaining information from respondent or, to enhance the collection of information that is most pertinent, questions may be structured hierarchically. In this way, responses for one or more questions may be used to gate the selection of subsequent questions. Alternatively, or in addition, questions may be in suites, with each suite dealing with a given area of inquiry. For example, in the college selection example, one suite of questions may address factors governing the experience of life at the school such as school size, social activities, geographic location, climate, facilities, nature of housing accommodations, and another suite may address conditions associated with pursing a given major (say history or engineering) at the school (conditions such as class size, expected hours per week studying, use of teaching assistants or use of full professors). Also, for example, in the job example, one suite may address company-related factors (such as expectation/participation in company-sponsored events, expectation around consensus building, locations, and emphasis on cross-training between functions), and another suite may address function specific matters (such as frequency of overnight travel, work week hours, and type of job training programs).

Figure 9:
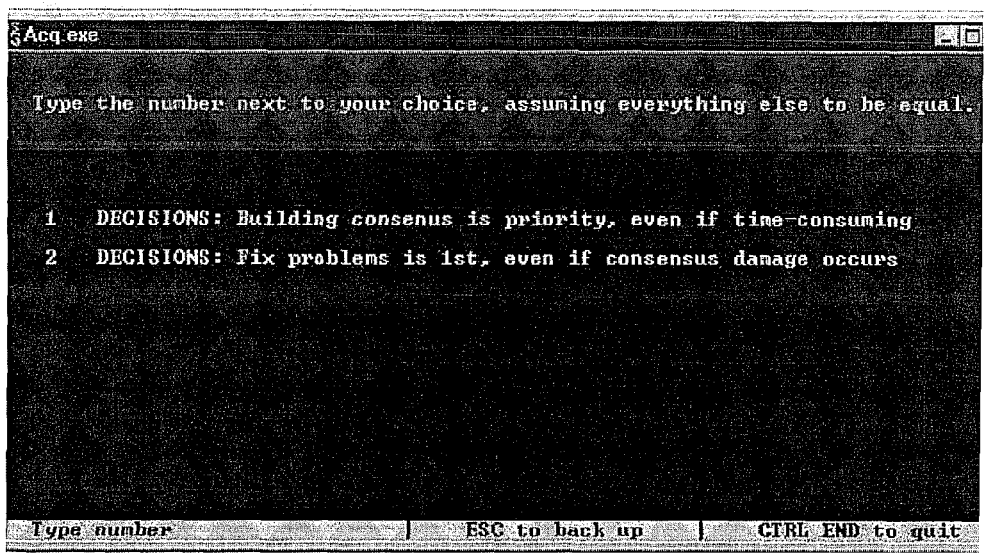
FIGS. 9, 10, and 11 are screenshots demonstrating hierarchically structured questions organized into three stages in accordance with an embodiment of the invention.
Figure 10:
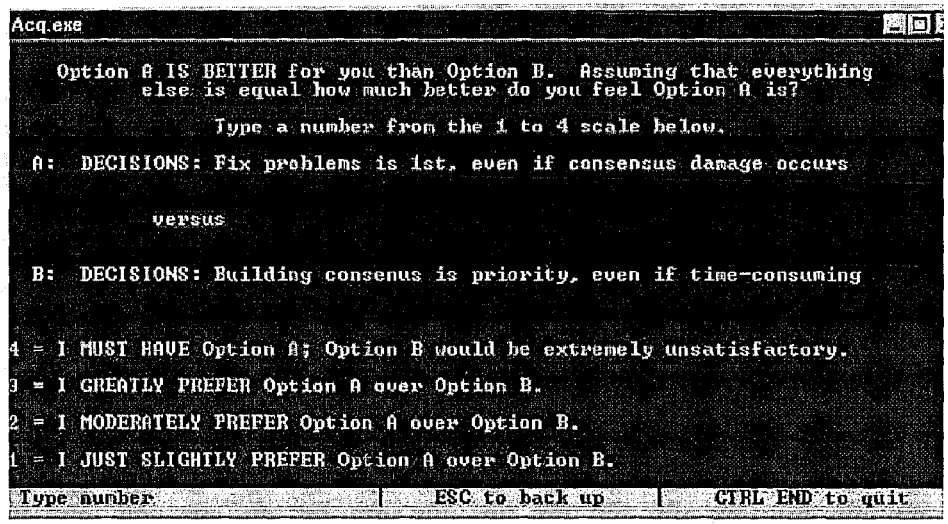
Figure 11:
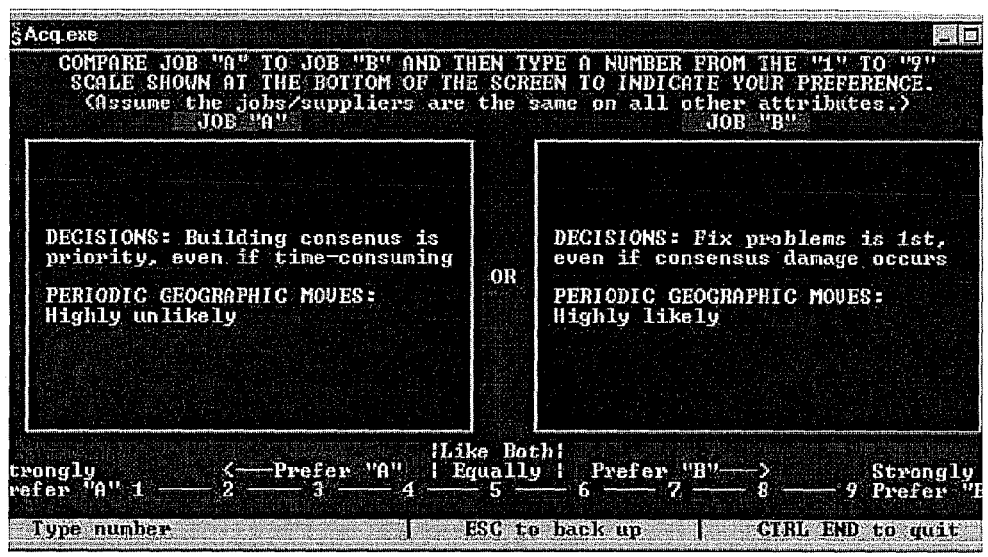

In one particular embodiment, the questions are organized into three stages. In the first stage, the respondent ranks the levels of each attribute, in descending order of preference. For example, "1" could signify the most preferred level, and "3" the least preferred level, for three possible levels of an attribute. In the second stage, the respondent is asked to rate his or her degree of preference for the most preferred level of each attribute, over its least preferred level; for example, the degrees of preference could be "1, slightly preferred"; "2, moderately preferred"; "3, greatly preferred"; "4, I must have—the least preferred level would be upsetting." Finally, in the third stage, a series of two-option choices is given to the respondent, forcing the respondent to express the degree to which he or she would prefer one of two multi-attribute combinations. For example, the respondent could be presented with option A and option B, each having different levels of two attributes, and asked to rank them on a scale of 1 to 9 (1 meaning "strongly prefer option A", 5 meaning "the two are equal," and 9 meaning "strongly prefer option B"). Examples of questions from each of these three stages are shown in FIGS. 9 through 11.

Once each respondent has provided a set of ratings $\{R_1, R_2, \ldots R_N\}$ in answer to the questions (process 202), the embodiment of FIG. 2 next calculates a preference profile for each respondent, which includes the utility value that each respondent places on possible levels of the attributes $\{a_i\}$ related to the proposed transaction. The preference profile is generated in process 203 by establishing, for each respondent, a utility function $U_i(a_i)$ for each attribute; this function provides a utility value corresponding to each level of the attribute $a_i$. The utility functions are generated by first calculating a total utility for each example combination that was ranked by the respondent. The total utilities are calculated by evaluating proposed utility functions for each attribute at the attribute levels composing each combination, and, for each combination, summing the resulting utility values. The functions are then chosen from amongst the proposed functions by the criterion that a ranking of the total utilities should correspond to the respondent's actual rankings as closely as possible. The result, for each respondent, is a utility function $U_i(a_i)$ chosen for each attribute $\{a_1, a_2, \ldots a_m\}$. Each utility function translates each level of its attribute into a utility for that respondent. So, for example, a utility function will be established for the college applicant's evaluation of the college location attribute (with a utility value corresponding to each location A, B, and C—say 0.3, 0.2, and 0.4), the class size attribute (with a utility value corresponding to small, medium, and large class sizes—say 0.5, 0.2, 0.1), and so on.

As in conventional conjoint analysis methods, the utility functions are normalized to permit comparisons between the utility values of given levels of different attributes. However, in conventional methods, respondents are typically treated as a class and their responses are analyzed collectively. Here the context is typically different, and the responses of each party (and counterparty) are typically analyzed separately, so that for each party and each counterparty there is obtained a separate set of utility functions. Furthermore, conventional methods produce utility functions in a one-sided, or unilateral, fashion. For example, a producer conventionally obtains a set of utility functions describing the preferences of consumers. By contrast, the method of the embodiment of FIG. 2 produces a set of utility functions for the party and each potential counterparty, and continues with a bilateral analysis as discussed below. However, as described below, in some circumstances the preferences of a group may be evaluated collectively. Also, the responses of any individual to questions may be augmented and extrapolated on the basis of data previously obtained for similar individuals.

The set of utility functions associated with a respondent (be the respondent a party or counterparty) are sufficient to characterize the preferences of the respondent. For example, there can be determined the relative importance that the respondent places on each attribute by calculating, for that attribute, the range of the utility function over the interval of possible attribute levels. A higher range for an attribute's utility function indicates a greater relative importance for that attribute. As an example, consider the hypothetical in the paragraph before last; the respondent's range of utility values for the college location attribute was 0.2 (from a low of 0.2 to a high of 0.4); and the range for the class size attribute was 0.4 (from a low of 0.1 to a high of 0.5). Class size is therefore relatively more important for that respondent than college location. More generally, there may be derived from the utility functions $U_i(a_i)$ for a respondent, a range vector $\{R_i\}$ having a series of components R corresponding in each case to the range of the utility function $U_i(a_i)$ over levels of the attribute $a_i$.

From the utility functions of a respondent there can be similarly determined the level of each attribute giving rise to the greatest utility experienced by the respondent. In other words, from the utility functions can be derived the attribute levels most preferred by the respondent. One may therefore determine a value vector $\{V_i\}$ for each respondent, as shown in process 204. The components of the value vector $\{V_i\}$ represent the levels of each attribute $\{a_i\}$ that maximize the respondent's utility function with respect to that attribute. In particular, if, for counterparty number two, three levels A, B, and C of attribute one $(a_1)$ correspond to utility function values of 0.2, 0.3, and 0.4 respectively, then level C will be chosen as $V_1$, since it gives the maximum utility value for this attribute.

Given the seminal nature of the utility functions, the preference profile for each respondent, in this embodiment, is the utility function vector $\{U_i(a_i)\}$ for each attribute $\{a_1, a_2, \ldots a_m\}$. In other embodiments, the preference profile may be composed of one or more of the value vector $\{V_i\}$ and the range vector $\{R_i\}$.

Once the utility functions are generated, the process of determining the counterparties having the closest fit with a party begins. As shown in FIG. 2, there are two alternate embodiments of the method of FIG. 2. In the first, called the aggregate value method, a list of counterparties having the closest fit is determined by following processes 204, 205, 206, and 208. In a second, alternative embodiment of the method of FIG. 2, called the distance value method, the list may be generated by following processes 207 and 208 (instead of processes 204, 205, 206, and 208).

In process 205 of the aggregate value method, a vector is generated corresponding to a pairing of each counterparty with the party. These vectors are formed by evaluating the party's utility functions (from process 203) at each counterparty's value vector levels (from process 204)—that is, at the counterparty's utility-maximizing values. There is thus formed, for each counterparty paired with the party, a vector $\{U_i(a_i)|_{V_i}\}$, where the vertical bar notation indicates evaluation of the party's utility function for attribute $a_i$ at $a_i = V_i$, and $V_i$ is the counterparty's utility-maximizing value for attribute $a_i$.

In process 206 of the aggregate value method, there is computed an aggregate value for each vector $\{U_i(a_i)|_{V_i}\}$ by summing the components $U(a_i)|_{V_i}$ of the vector; i.e. by evaluating the sum $$\sum_{i=1}^{m} U_i(a_i) \bigg|_{V_i}.$$

In process 208 of the aggregate value method, the counterparty that, when paired with the party, produces the greatest aggregate value is identified as having the closest fit of preferences to the party. Similarly counterparties yielding lower aggregate values when paired with the party are viewed as having a poorer fit of preferences to the party. By selecting a group of the highest ranking counterparties, there can be provided a list of counterparties having a relatively close fit of preferences with those of the party.

In the distance value version of the embodiment of FIG. 2, a list of counterparties providing a relatively close fit of preferences is generated by using a distance measure between the utility functions generated in process 203 for the party and each counterparty. First, a utility function vector $\{U(a_i)\}$ is generated for the party and each counterparty as described in process 203 above. Then, in process 207, for each possible counterparty that can be paired with the party, a distance value is generated by comparing the utility functions of the pair. For example, a linear distance value D may be computed using a distance measure as follows:

$$D = \sum_{i=1}^{m} \sum_{j=1}^{J_i} \left[ \text{Abs}\{U_i(a_i)|_{L_j} - U_i'(a_i)|_{L_j}\} \right], \quad \text{\{Equation 1\}}$$

where the distance value D is calculated for each possible counterparty paired with the party; and where Abs { } indicates the absolute value of the subtraction result in the brackets; m is the number of attributes $\{a_i\}$; $J_i$ is the number of levels of attribute $a_i$; $U_i(a_i)$ is the party's utility function for attribute $a_i$; $U_i'(a_i)$ is the counterparty's utility function for attribute $a_i$; and the vertical bar notation indicates evaluation of the function at attribute level $L_j$.

In process 208 of the distance value method of FIG. 2, the counterparty that, when paired with the party, produces the lowest distance value P is identified as having the closest fit of preferences with the party. Similarly counterparties yielding higher distance values when paired with the party are viewed as having a poorer fit of preferences with the party. By selecting a group of the lowest distance valued counterparties, there can be provided a list of counterparties having a relatively close fit of preferences with those of the party. While the illustration above uses a linear distance measure that is minimized, other distance measures may also be employed, including, for example, a least-squares approach. In such a way, the embodiment of FIG. 2 allows parties and counterparties to make decisions about potential transactions based on a bilateral evaluation of preferences.

While the embodiment of FIG. 2 has been described with reference to a list of counterparties being provided to a party, it should be understood that, given any two classes of parties denominated "parties" and "counterparties," the embodiment of FIG. 2 can equally be used to recommend a list of parties to a counterparty; this may be accomplished by simply following the described processes, but replacing the term "party" with "counterparty," and vice versa. Generally, it should be understood that embodiments of the invention are symmetrical with respect to two sides of a transaction, in that they may be used equally to recommend decisions to one side as to the other.

Furthermore, where embodiments are described in which, first, a preference profile is generated for persons on one side of a transaction, and then a preference profile is generated for persons on the other side of the transaction, it should be understood by those of ordinary skill in the art that the order of questioning the persons, and of generating the preference profiles, is not essential. Thus, where it is described to ask questions of persons on one side of a transaction first, and then of persons on the other, it should be understood that it is equally possible to reverse the order of questioning (by asking questions of the opposite side of the transaction first), or even to ask questions of both sides simultaneously.

In a further related embodiment, parties and counterparties are enabled to make decisions based on a multilateral evaluation of preferences. In such an embodiment, the method proceeds as described for FIG. 2, except that questions are asked not only of parties and counterparties, but also of one or more co-evaluators. A co-evaluator may be any natural person or an entity, as with the parties and counterparties. The party, and any of the possible counterparties, may wish to include the input of a co-evaluator as an aid to decision-making. Thus, for example, a college applicant party may wish to have a guidance counselor or his parents evaluate the circumstances under which he performs best, or seems most content, in order to aid him in deciding which college to attend. Similarly, a college counterparty may wish to have input from alumni/ae, faculty, and current students to guide in selection of students to admit. In a merger, a corporation party may wish to have the members of its various departments, and even some of its customers and/or suppliers, act as co-evaluators, to assist in determining the degree of "culture fit" with a corporate counterparty with which it is merging.

In each case, the co-evaluator chosen has a useful perspective on the party or counterparty's preference profile. The question array, ranking, utility function, and value vector procedures are followed as in boxes 201 through 204, except that in this multilateral embodiment they are performed for at least one co-evaluator, based on his or her own perception of the associated party's or counterparty's preferences, in addition to being performed by the parties and counterparties themselves.

Co-evaluators may fall into two exemplary categories, although they are not limited to these categories. In the first exemplary category, the co-evaluator provides input concerning the circumstances under which his or her associated party or counterparty is most content or satisfied. In this category, the co-evaluator can be said to provide a preference profile for his or her associated party or counterparty.

In the second exemplary category, the co-evaluator provides input concerning the circumstances under which his or her associated party or counterparty performs best. In this category, the co-evaluator can be said to provide a success profile for his or her associated party or counterparty.

Attributes for co-evaluators typically mirror those for parties and counterparties. For example, in the college-admissions example discussed in connection with FIG. 2, attributes for a guidance counselor co-evaluator could be: "Prospect does best in environments that . . . " or "Prospect is happier with products or services that . . . " Similarly, questions for a co-evaluator for a counterparty may be structured to elicit answers to the questions: "People who do well here typically like jobs that . . . " or "Users who are satisfied with this purchase typically prefer items that . . . ."

A co-evaluator for a party or counterparty need not be a single person; it could also be a group of people. For example, a corporate counterparty may wish to use the members of a given department as its co-evaluators in a transaction. In such a case, i.e. where a co-evaluator consists of a group of individuals, questions are asked of each member of the group of co-evaluators, and rankings are obtained from each. Then a single set of utility functions (one function for each attribute) is generated for the group of co-evaluators. This may be done by averaging utility functions for each member of the group; by weighting some members' utility functions more highly, in a weighted average of functions (with the optimal weighting determined based on the context of the transaction); or by allowing the counterparty (or party) associated with the co-evaluator to choose which group member's profile to use as the co-evaluator's profile.

Where there is a group co-evaluator, or where there is more than one co-evaluator for a single party or counterparty, it may also be useful to provide a visual display of each co-evaluator's preference profile to parties and counterparties. Such a visual display could take the form of a histogram, with a bar indicating the relative value of attributes; or the visual display could graphically display a utility function for each attribute, for each co-evaluator. Another useful visual display could be a scatterplot or distribution (characterized, for example, by a mean and standard deviation) of the preference profile results from more than one co-evaluator. By using such visual displays, parties and counterparties may be enabled to weigh the input of multiple co-evaluators in a comparative and qualitative fashion.

When a party or counterparty uses a co-evaluator, methods according to embodiments of the invention may require the party or counterparty's permission, before releasing a co-evaluator's preference profile to other respondents in the decision-making process.

Once a preference profile has been obtained for the party, each counterparty, and each co-evaluator, the next process in a multilateral embodiment of the invention is, as with the bilateral embodiments described above, to recommend a list of counterparties providing a relatively close fit of preferences. First it must be determined, for each party and counterparty who used a co-evaluator, how to use the co-evaluator's preference profile in the analysis. In one embodiment, this is performed by the following algorithm:

1) Determine the closeness of fit of the party or counterparty's preference profile with that of its associated co-evaluator. This may be done using the aggregate value method or the distance value method (each described above for a bilateral embodiment).

2) If the profile of the co-evaluator is close enough to that of the party or counterparty, as judged against a pre-established standard, then the party or counterparty's own profile will be used for comparison with potential partners to the transaction.

3) If, however, the co-evaluator's preference profile differs sufficiently from that of its associated party or counterparty (as judged against the pre-established standard), then the associated party or counterparty is given a choice as to which preference profile to use for comparison with potential partners to the transaction. The party or counterparty may choose to use its own profile only, or that of the co-evaluator only, or (optionally, for an additional fee) to use each profile separately and obtain results using each.

Once it is determined which preference profile will be used for the party and each counterparty, a multilateral embodiment of the invention proceeds as described above for bilateral embodiments. The result of this multilateral embodiment, then, is to provide a list of counterparties to the proposed transaction who provide a relatively close fit of preferences with those of the party, in a way that takes into account the perspective of at least one co-evaluator.

Because decisions are recommended based on the preferences of more than one party to a transaction, embodiments of the invention are particularly advantageous for long-term, relational transactions. Examples have been provided above of utilization of embodiments in situations where parties and counterparties may lack any previous business relationship. However, such a circumstance is in no way a necessary foundation for application of embodiments of the present invention. For example, embodiments of the present invention may be employed for evaluation of existing relationships between employer and employee. Questions in such a circumstance may, for example, be directed to particular work conditions, such as scheduling of employee's work hours during the day, work rules and changes to physical facilities. In this manner, management and employees may usefully evaluate potential issues of importance in the work environment. As another example, embodiments of the present invention may be applied within corporations to determine where there is "gear grinding" within the organization (inefficient or counterproductive relationships), or areas of difficulty in "culture fit" between merged companies.

Similarly, embodiments of the present invention may be used in tandem with more traditional evaluation techniques. For example, potential employees may be identified using traditional techniques, and thereafter promising candidates along with human resources managers may be subjected to co-evaluation in accordance with an embodiment of the present invention.

It is equally possible to refine evaluation techniques in various embodiments herein. One method of refinement is to consider instances wherein a close fit has been predicted by an embodiment, but wherein experience later shows there to be a problem. (Or alternatively, a close fit has not been predicted, but nevertheless resulted.) When the reason for the outcome is uncovered, it may be due to an attribute that had not been previously identified, or due to an ineffective or badly worded question. In such cases, the questions posed to respondents may be modified to take into account a new attribute or to correct ineffective questions. The questions may then be used for new submissions to future respondents or can optionally be resubmitted to former respondents. Alternatively, or in addition, the problem may be attributable to improper analysis of the answers to the questions, and these matters can be adjusted by modifying, for example, the utility functions associated with the party or counterparty as appropriate, and re-performing the analysis.

Figure 3:
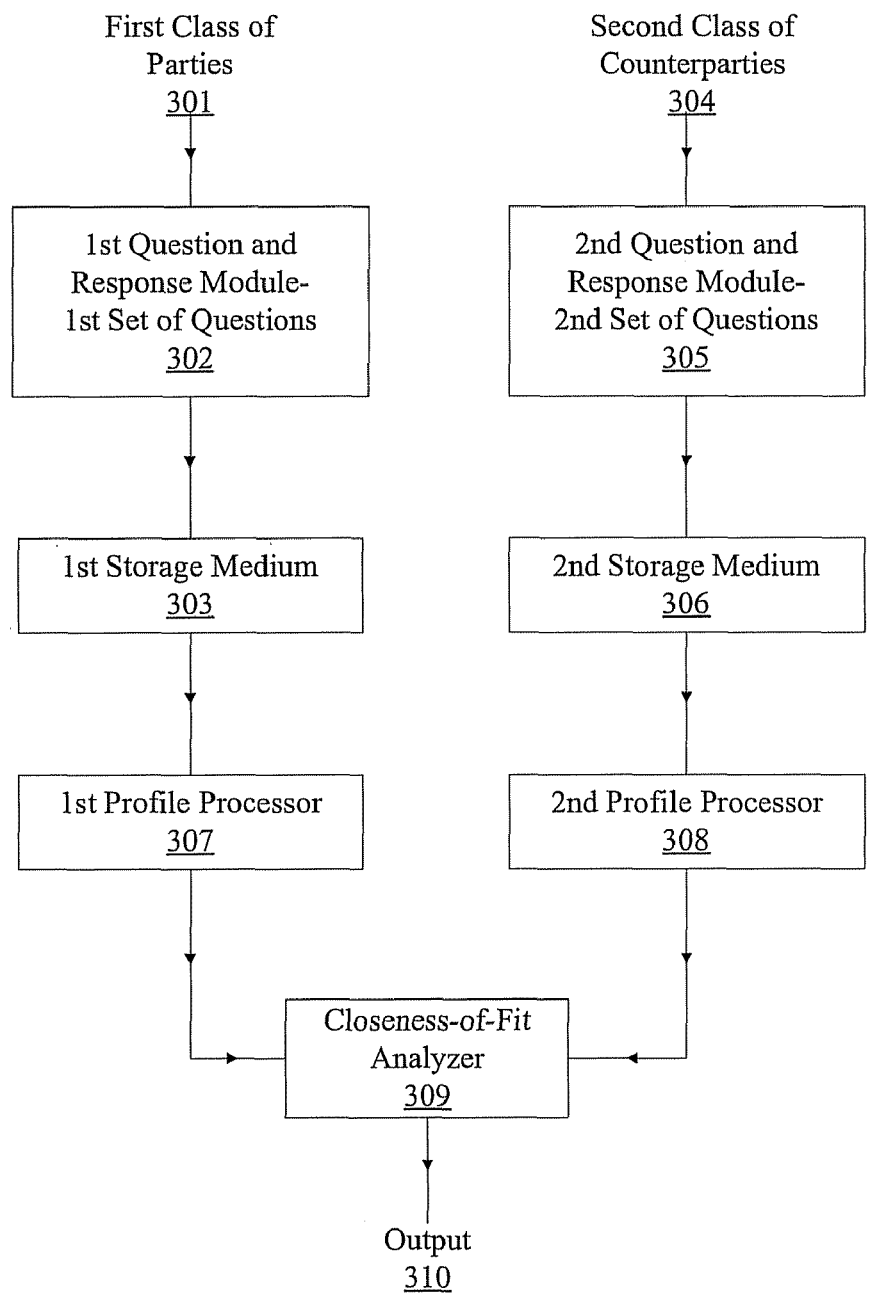
FIG. 3 shows a block diagram of an embodiment of a system in accordance with the present invention.

FIG. 3 shows a block diagram of an embodiment of a system in accordance with the present invention. A first question and response module 302 obtains responses from each member of a first class of parties 301 to a first set of questions. The questions are designed to elicit revelation of preferences that can be used to estimate the closeness of each party's fit with potential counterparties to the transaction. The first question and response module then stores the party's responses in a first digital storage medium 303.

Similarly, a second question and response module 305 obtains responses from each member of a second class of counterparties 304 to a second set of questions. These questions are, similarly, designed to elicit revelation of preferences that can be used to estimate the closeness of each counterparty's fit with potential parties to the transaction. The second question and response module then stores the counterparty's responses in a second digital storage medium 306.

A first profile processor 307 uses the responses stored in first storage medium 303 to derive a first preference profile for each party, and a second profile processor 308 uses the responses stored in second storage medium 308 to derive a second preference profile for each counterparty.

A closeness-of-fit analyzer 309 analyzes the preference profile generated for each party by first profile processor 307 in relation to the preference profiles generated by second profile processor 308. For each party, the result is an output ranked list 310 of counterparties providing a relatively close fit of preferences with that party, compared with the other potential counterparties. The closeness-of-fit analyzer communicates such a list to each party.

In embodiments of systems according to the invention, the first and second question and response modules 302 and 305, the first and second profile processors 307 and 308, and the closeness-of-fit analyzer 309 may be implemented as computer processes running on multiple computers in communication with each other (for example over a network, including the Internet), or as processes running on a single computer. Similarly, the first and second digital storage media 303 and 306 may be separate storage devices, or portions of a single digital storage medium.

In a preferred embodiment, the system of FIG. 3 is implemented as a host computer accessible over a network, such as the Internet. In particular, parties 301 and counterparties 304 may access the system using remote computers which are in communication with a host computer via Web pages of a web site on the World Wide Web. The host computer is then a web server, which runs computer processes that implement the first and second question and response modules 302 and 305, the first and second profile processor 307 and 308, and the closeness-of-fit analyzer 309. The server stores responses to questions in an associated content storage device (for example at least one hard disk drive), which serves as first and second storage media 303 and 306. The server may communicate with parties and counterparties using e-mail, or by making information available on a web site, or by other communication methods.

Further information concerning the Internet and E-mail (both of which terms are used throughout this specification) is provided, for example, in Gralla, *How the Internet Works* (Ziff-Davis Press, 1996), which is hereby incorporated by reference; see especially pages 44-49.

In further embodiments of systems and methods according to the invention, communication with a server and information processing may be implemented using wireless devices.

Figure 4:
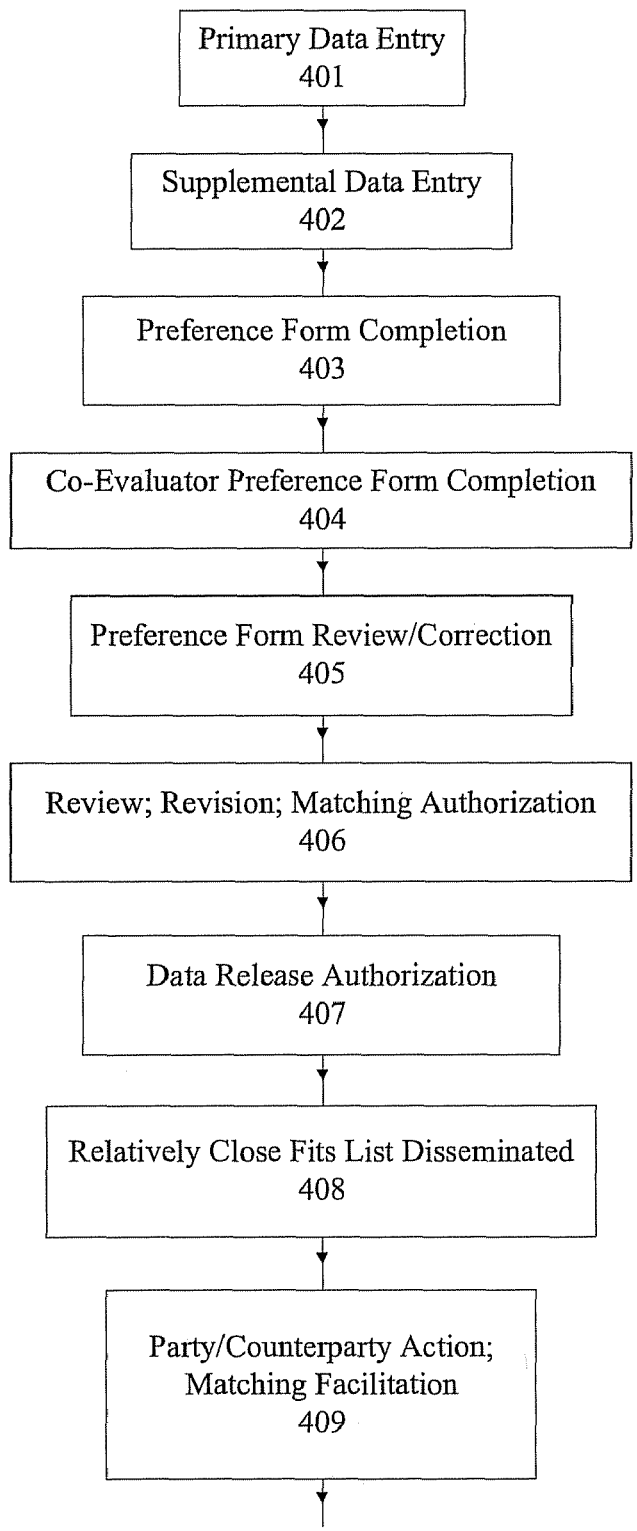
FIGS. 4 and 5 illustrate the logical flow of a method according to an embodiment of the invention, that may be implemented using a web server on the Internet.
Figure 5:
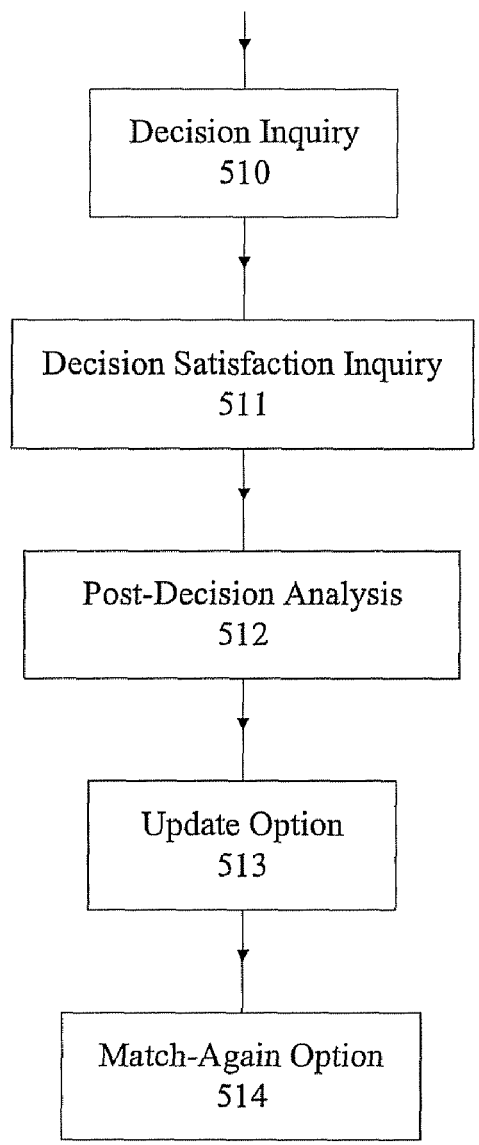

FIGS. 4 and 5 illustrate the logical flow of a method according to an embodiment of the invention that may be implemented using a web server on the Internet. This embodiment also illustrates use of the processes described above in connection with the system of FIG. 3.

In box 401, a system, which may be a website server on the Internet, receives primary data from parties and counterparties, via guided templates for data entry. Each party or counterparty enters the site, registers basic information (for example name, address, and other contact information), and selects a decision area from a set of pre-set parameters. The pre-set decision areas may be, for example, college selection or employment searching. For college selection, the party could be a college applicant, and the counterparty may be a college looking for or decided which students to admit; for employment searching, the party may be a job candidate looking for a job, and the counterparty may be an employer looking for employees or deciding amongst candidates. After receiving the decision area choices, the system prompts the party or counterparty, via guided templates, for information on co-evaluators that he or she wishes to include in the decision-making process. The system also gives the party or counterparty the option of using data from only the co-evaluators in making the decision (with no input from the party or counterparty himself). Finally, the party or counterparty authorizes payment, and the system receives and verifies the payment method (for example, credit card payment).

Next, in box 402, the system prompts each party and counterparty, via guided templates, for supplemental data that might be useful later in the process of evaluation. For example, a job candidate party may be prompted for, and register, a formatted résumé. A college applicant party may be prompted for, and register, a summary of his academic history. In each case, the prompted supplemental data is potentially useful to a counterparty (e.g. an employer or a college) later in the process of evaluation (described below). Similarly, the system prompts counterparties for supplemental data that are potentially useful to parties later in the decision-making process. For example, if the counterparty is a company searching for job candidates, the company's supplemental data may be "leads" on housing opportunities, which would be attractive to job candidates who need to find housing near the company. Once the parties and counterparties have entered supplemental data, the system assigns a unique identifier to each user, including parties, counterparties, and any co-evaluators that they have named. The system also creates a file for each user, and associates each file with the corresponding unique identifier.

The system next, in box 403, disseminates a questionnaire form to each party and counterparty, along with the unique identifier assigned to each. (This process is omitted for a party or counterparty who has elected to have evaluation performed by a co-evaluator only, as described above in connection with box 401.) The system then administers the questionnaire forms to each party or counterparty. For example, the system may guide the party or counterparty through a series of questions formatted as templates on Web pages on a web site, through which the system receives each party's (or counterparty's) answers to the questions. The questions on the questionnaire form are designed to elicit the utility value which the respondent places on possible levels of each attribute, without necessarily asking for preferences directly. For example, the questions may be structured to elicit from the parties answers to the questions: "I do best in environments that . . . " or "I'm happier with products or services that . . . " Similarly, the questions for counterparties may be structured to elicit answers to the questions: "People who do well here typically like jobs that . . . " or "Users who are satisfied with this purchase typically prefer items that . . . ."

As previously discussed, Tables 1-3 show examples of questions that may be used, in various embodiments of the invention, for eliciting preferences in the areas of college selection (Table 1), mutual fund selection (Table 2), and employment selection (Table 3).

In box 404, the system disseminates a questionnaire form to each co-evaluator, and administers the form to the co-evaluator, in a fashion similar to that described for box 403. (If no co-evaluators were named for a given party or counterparty, then this process is omitted). The questions for a co-evaluator are structured to elicit the co-evaluator's perspective on the associated party or counterparty's preferences, without necessarily asking for preferences directly. The questions may, for example, elicit input concerning the utility value which the associated party or counterparty places on possible levels of each attribute; or may elicit input concerning the circumstances under which the associated party or counterparty performs best. For example, questions for a co-evaluator for a party might be structured to elicit answers to the questions: "Prospect does best in environments that . . . " or "Prospect is happier with products or services that . . . ." Similarly, questions for a co-evaluator for a counterparty may be structured to elicit answers to the questions: "People who do well here typically like jobs that . . . " or "Users who are satisfied with this purchase typically prefer items that . . . ."

In box 405, the system reviews for internal consistency the completed preference forms that it received from boxes 403 and 404. For each form, when the extent of logical inconsistency exceeds a desired level, the system communicates the fact of inconsistency to the respondent who completed the form, and asks whether he or she wishes to fill out the form again. A stark example of such an internal inconsistency is where a respondent has answered three questions, in the same answer form, with the answers "I prefer A to B"; "I prefer B to C"; and "I prefer C to A." Checks of internal inconsistency are useful, for example, in detecting respondents who are attempting to "game the system," by providing answers that show preferences for given attributes, when in fact their preferences are otherwise; often, in such a case, the respondent inadvertently answers questions in an inconsistent fashion. If the inconsistent form was completed by a party or counterparty, then the party or counterparty is also given the option of allowing the process to continue using only input from co-evaluators. If a respondent who filled out an inconsistent form does not respond to a request to fill out the form again, then the process continues without that respondent's input.

Figure 6:
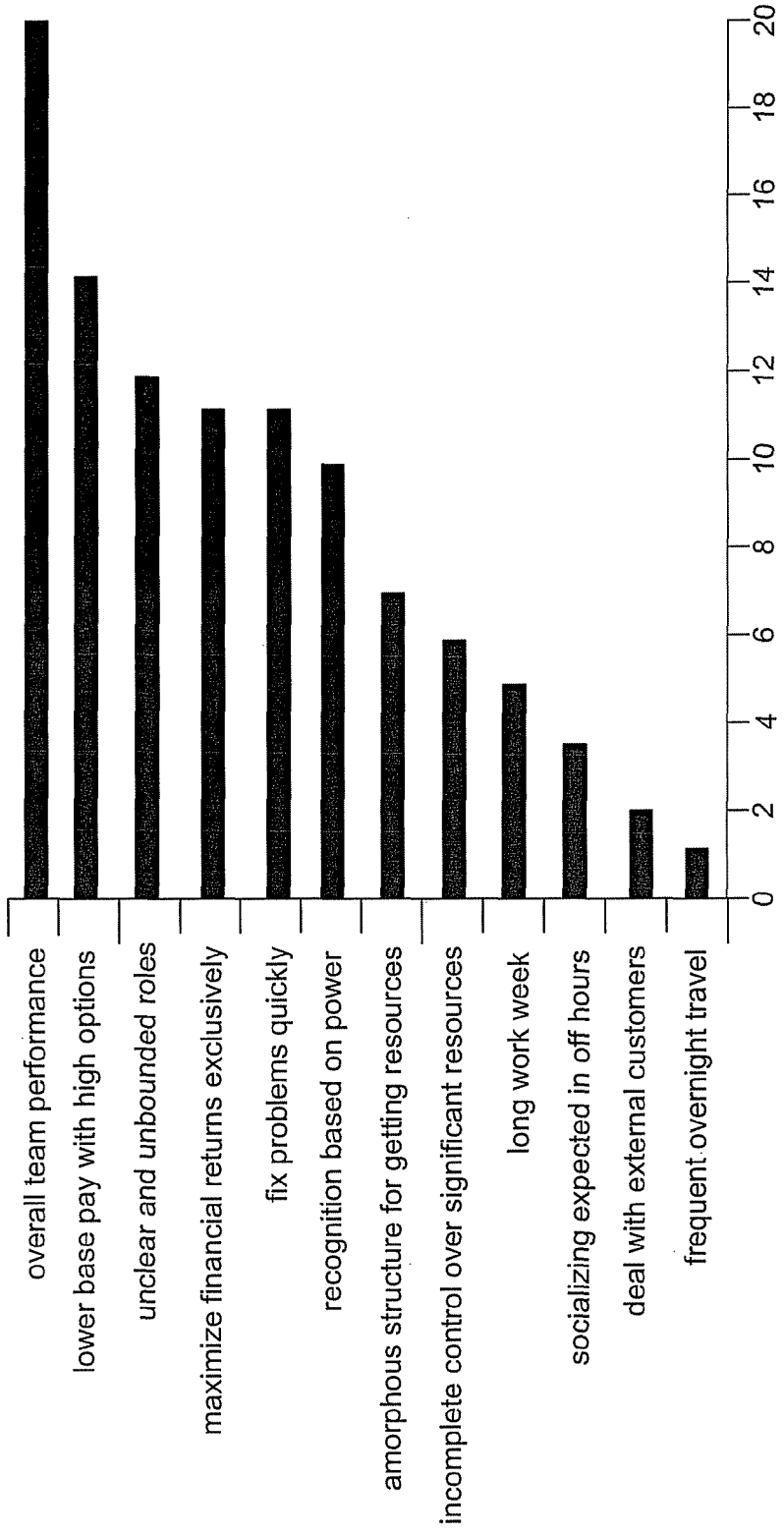
FIGS. 6 and 7 are histogram representations of a preference profile of a party who is a job applicant and of a counterparty employer in accordance with an embodiment of the invention.
Figure 7:
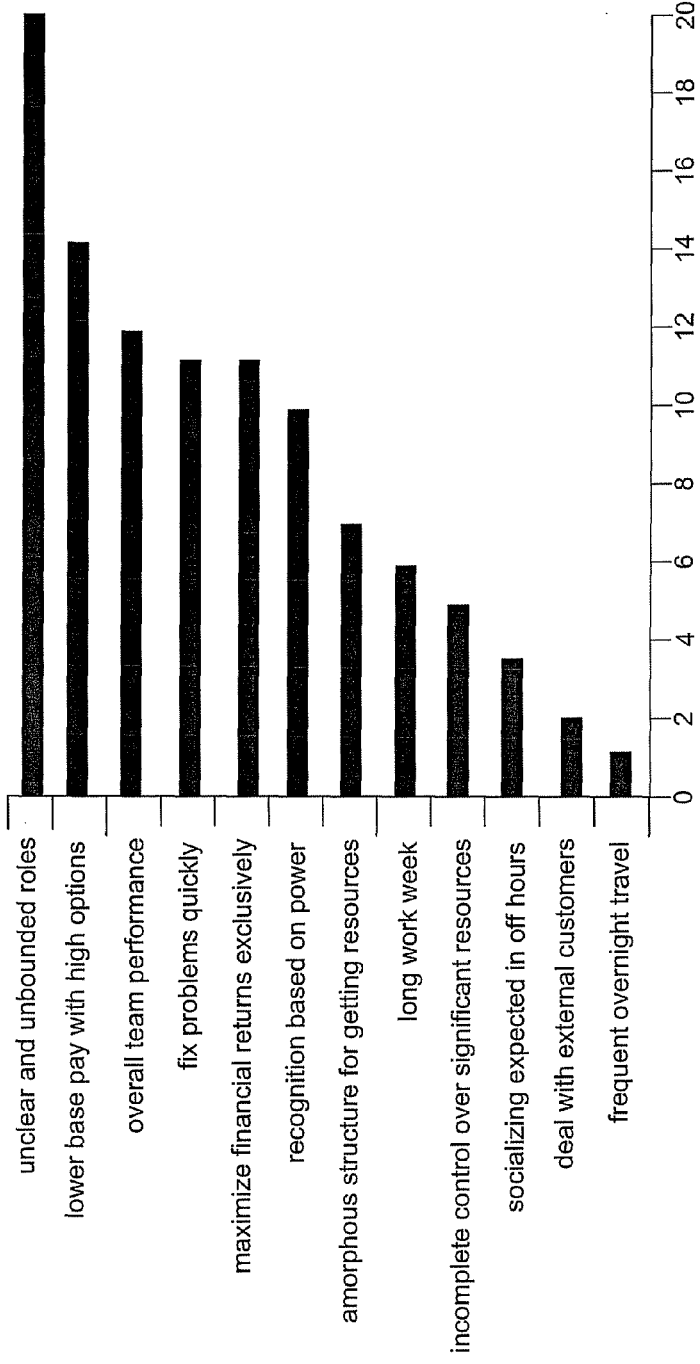
Figure 8:
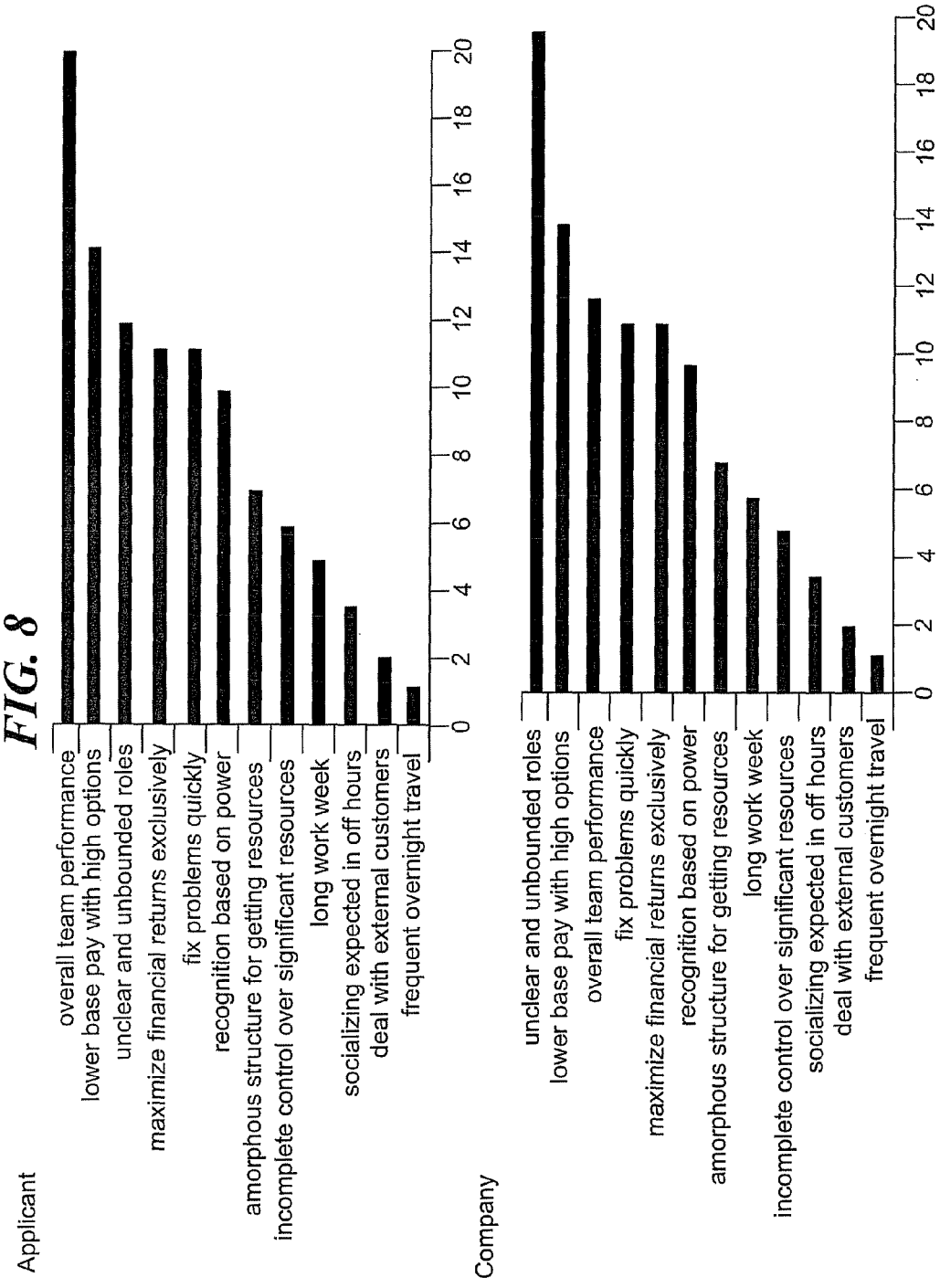
FIG. 8 presents a side-by-side comparison of the preference profiles of FIGS. 6 and 7.

Next, in box 406, the system sends to each party such party's preference profile and profiles of any co-evaluators and to each counterparty such counterparty's preference profile and profiles of any of such counterparty's co-evaluators. The aggregated profile reveals to the party or counterparty the results of performing a forced-choice analysis, or other preference analysis (including conjoint analysis) using the party's answers to the preference form questions. Thus it may reveal to the party or counterparty the weight that he or she places on attributes that were analyzed, or the levels of each attribute that he most preferred, or the utility value that he or she places on possible levels of each attribute, as determined by the preference analysis. Optionally, such information may be presented in a histogram or other graphical display, in order to visually display the results of the analysis. An example of such a histogram for a job applicant is shown in FIG. 6; a corresponding histogram for a counterparty employer is shown in FIG. 7; and a histogram showing a side-by-side comparison of the two is shown in FIG. 8. Note that histograms may be used to display weights or values or both; they are used for values only where the values in question are quantitative (as opposed to categorical or yes/no) variables.

The party or counterparty is also given information about significant gaps between the results of his preference analysis and the results of his co-evaluators, either in weighting of attributes, or in most preferred attribute levels, or both. Such gaps may optionally be displayed by a side-by-side comparison of histograms, as is illustrated by FIG. 8. Knowing these gaps may lead a party (or counterparty) to re-examine its conception of its own preferences; a large gap between the respondent's own perception of its preferences as compared with that of others may mean that the respondent was not truly aware of its own preferences. Accordingly, the party or counterparty (as the case may be) is given the choice of using its own preferences or those of one of its co-evaluators, as described further below.

As described below in connection with box 513, it is possible to permit each party and counterparty to update its preference profile; when there is a decision to update, the process must accommodate the collection of new preference data to provide a new analysis that will differ from the original analysis if responses to the questionnaire form are different from the original responses. In presenting the option to update, the system sends the party or counterparty his original decision area choice, and gives him the opportunity to revise the choice (thereby returning to box 401). The system asks the party or counterparty for authorization to proceed to the process of looking for relatively close fits amongst a pool of counterparties or parties (respectively). The system also gives the party or counterparty the option of repeating the preference form processes (thereby repeating boxes 403 through 405), or of adding or dropping co-evaluators (thereby returning to boxes 402 and 404-406). (The addition of a co-evaluator or the updating of the profile may optionally trigger the requirement of paying an extra fee.)

In box 407, the system obtains authorization from each party and counterparty to release the results of the search for relatively close fits. Each party has three or more options, including: a) to receive the results, without the same information being sent to any counterparties; b) to receive the results, and to have the results sent to counterparties with name or other key identifying data on the party withheld; or c) to receive the results, and to have the results sent to counterparties with full information on the party. Each counterparty is given corresponding options for release to parties (including the option to withhold the counterparty's name or other key identifying data from the parties).

Next, in box 408, the system generates, and communicates to each party and counterparty, a ranked list of relatively close fits for that party or counterparty amongst the pool of reciprocal parties, based on the use of a bilateral or multilateral preference methodology. This list may contain network addresses, web links or e-mail addresses, or other methods of contacting reciprocal parties on the list. Also, it may contain a listing of what information about the recipient has been sent to each of the reciprocal parties on the list, in accordance with the authorization received in box 407 (above).

In box 409, the system facilitates action by parties and counterparties to identify and contact reciprocal parties. For example, the system may enable a party to contact a counterparty by using a web link on a web site, or by using a web link sent to the party as part of an e-mail; or the system may provide phone numbers or other contact information, as authorized in box 407 (above).

Continuing with box 510 in FIG. 5, the system next queries each party and counterparty as to what decisions it has made in the decision area for which the analysis was performed; for example, a party could be asked what job he or she accepted, or what product he or she selected; and a counterparty could be asked which job candidates it selected for employment. These decision inquiries are repeated at time intervals that are either chosen by the registrant in the primary data entry process of box 401, or are specified to the registrant during the primary data entry process, or are otherwise scheduled by the system.

In box 511, the system communicates a query to each party and counterparty as to its satisfaction with the decision that it made, after it has been informed that the party or counterparty has made the decision. This decision satisfaction inquiry is performed at a time interval after process 510 that is either chosen by the registrant in the primary data entry process of box 401, or pre-determined in the system.

Next, in box 512, the system, in one embodiment, performs a post-decision analysis. It analyzes key attributes that contributed to each party and counterparty's degree of satisfaction, by comparing each one's reported degree of satisfaction (from box 511) with the analyzed preference form results obtained in boxes 406 and 408. The system communicates to each party and counterparty its individual post-decision analysis, and provides each with a structured opportunity to respond to the analysis, e.g. by providing a set of web-page templates enabling the party or counterparty to comment on the key attributes identified in the post-decision analysis. Additionally, the system stores the results of the post-decision analysis, and the comments on it. Owing to the collection, in the course of practicing embodiments discussed in this description, of substantial quantities of data that tend to be of a personal nature, it is within the scope of various embodiments to preserve the confidentiality of such data and to disclose such data only under circumstances to which the affected individuals and organizations have given their consent.

Large discrepancies between a preference form analysis and a post-decision report may indicate that the respondent did not understand its own preferences well. Thus, such post-decision reports may help parties and counterparties to learn about themselves, and therefore to make better decisions in the future.

Results of post-decision analyses may be used to revise the system's method of preference form analysis, or to revise the questions which are asked in each decision area. For example, if it is discovered that some college applicant parties have decided to attend colleges with which they were unhappy, and some were unhappy based on attributes that the preference form did not elicit, then the preference form for the college choice decision area could be altered to incorporate the overlooked attributes.

As part of the post-decision analysis, the system may also provide a co-evaluator with a report on the party or counterparty's reported degree of satisfaction. For example, a college guidance counselor co-evaluator can be provided with a report on a college applicant party's (or a group of parties') degree of satisfaction, so that the counselor can modify his or her counseling in the future.

Note, however, that in some contexts it is preferable to guarantee that a party's post-decision report will be kept in confidence with respect to (at a minimum) the counterparty with which the party entered a transaction (and vice versa for a counterparty's confidences). For example, it is preferable to guarantee confidentiality to an employee party who reports dissatisfaction with an employer counterparty in a post-decision report.

In box 513, the system invites each party and counterparty to update its preference profile. If the party or counterparty agrees, the process begins anew, beginning with box 401, above. For such updates, the process retains the data from the original analysis process, and updates it according to the new input which the party or counterparty provides. The pricing to users may be configured so that additional charges may be made for updates, as opposed to original analyses. A party or counterparty may also initiate the update process itself, without an invitation; this may, for example, be implemented by providing an update option for registrants on a web site. As part of an update, the system also allows a party or counterparty to add or delete co-evaluators. If the update option is not selected, the process proceeds to box 514.

In box 514, the system invites each party and counterparty to perform a new matching process for closeness of fit, based on its current preference profile. If the party or counterparty agrees to do so, the process begins anew at box 407, with the pricing changed accordingly.

Although this description has set forth the invention with reference to several preferred embodiments, one of ordinary skill in the art will understand that one may make various modifications without departing from the spirit and the scope of the invention, as set forth in the claims.

We claim:

1. A computer-implemented method for facilitating evaluation, in connection with the procurement or delivery of products or services, in a context of at least one of (i) a financial transaction and (ii) operation of an enterprise, such context involving a first class of parties in a first role and a second class of counterparties in a second role, the method comprising:

in a first computer process, retrieving first preference data from a first digital storage medium, the first preference data including attribute levels derived from choices made by at least one of the parties in the first class;

in a second computer process, retrieving second preference data from a second digital storage medium, the second preference data including attribute levels derived from choices made by at least one of the counterparties in the second class;

in a third computer process, for a selected party, performing multilateral analyses of the selected party's preference data and the preference data of each of the counterparties, and computing a closeness-of-fit value based thereon; and in a fourth computer process, using the computed closeness-of-fit values to derive and provide a list matching the selected party and at least one of the counterparties.

2. A method according to claim 1, wherein the list is ranked according to closeness of fit.

3. A method according to claim 1, further comprising receiving co-evaluator choices made by a party co-evaluator or a counterparty co-evaluator, wherein the list matches the at least one party and the at least one counterparty according to a multilateral analysis of preference data determined using such co-evaluator choices.

4. A method according to claim 1, wherein the party choices reveal, with respect to each level of each of a first series of attributes, a utility value which indicates the value that the party places on the level of the attribute.

5. A method according to claim 4, wherein the party choices reveal the utility values without the utility values being provided explicitly.

6. A method according to claim 4, wherein the counterparty choices reveal, with respect to each level of each of a second series of attributes that complements the first series of attributes, a utility value which indicates the value that the counterparty places on the level of the attribute.

7. A method according to claim 6, wherein the counterparty choices reveal the utility values without the utility values being provided explicitly.

8. A method according to claim 1, wherein at least one of the first preference data, second preference data, and the list is obtained from a remote server over a communication network.

9. A method according to claim 1, wherein the party choices and the counterparty choices are provided to a remote server over a communication network.

* * * * *